United States Patent [19]

Carter et al.

[11] Patent Number: 4,909,933

[45] Date of Patent: Mar. 20, 1990

[54] APPARATUS FOR MIXING SOLUTIONS IN LOW GRAVITY ENVIRONMENTS

[75] Inventors: Daniel C. Carter, Huntsville; Mary B. Broom, Decatur, both of Ala.

[73] Assignee: The United States of America as represented by the Administrator of the National Aeronautics and Space Administration, Washington, D.C.

[21] Appl. No.: 244,369

[22] Filed: Sep. 15, 1988

[51] Int. Cl.$^4$ .......................... B01D 13/00; B01F 5/06

[52] U.S. Cl. .......................................... 210/95; 210/94; 210/205; 210/247; 210/257.1; 210/321.6; 210/340; 210/424; 137/625.19; 137/625.47; 366/336; 422/101; 422/102; 422/103

[58] Field of Search ................... 210/94, 95, 143, 247, 210/321.6, 340, 420, 424, 198.1, 205, 206, 257.1; 137/625.19, 625.47, 884; 251/368; 366/241, 336, 340; 422/101, 102, 103, 261

[56] References Cited

U.S. PATENT DOCUMENTS

| | | | |
|---|---|---|---|
| 290,000 | 12/1883 | Detrick | 210/95 |
| 3,610,285 | 10/1971 | Passaggio | 251/368 |
| 3,766,943 | 10/1973 | Murata | 137/884 |
| 3,858,499 | 1/1975 | Scott | 210/321.6 |
| 4,569,236 | 2/1986 | Kitchen et al. | 137/625.19 |
| 4,602,657 | 7/1986 | Anderson, Jr. et al. | 137/625.19 |

*Primary Examiner*—W. Gary Jones

*Attorney, Agent, or Firm*—William J. Sheehan; John R. Manning; Jerry L. Seemann

[57] ABSTRACT

An apparatus is disclosed for allowing mixing of solutions in low gravity environments so as to carry out crystallization of proteins and other small molecules or other chemical syntheses, under conditions that maximize crystal growth and minimize disruptive turbulent effects. The apparatus is comprised of a housing, a plurality of chambers, and a cylindrical rotatable valve disposed between at least two of the chambers, said valve having an internal passageway so as to allow fluid movement between the chambers by rotation of the valve. In an alternate embodiment of the invention, a valve is provided having an additional internal passageway so that fluid from a third chamber can be mixed with the fluids of the first two chambers. This alternate embodiment of the invention is particularly desirable when it is necessary to provide a termination step to the crystal growth, or if a second synthetic step is required.

16 Claims, 2 Drawing Sheets

APPARATUS FOR MIXING SOLUTIONS IN LOW GRAVITY ENVIRONMENTS

ORIGIN OF THE INVENTION

The invention described herein was made in the performance of work under a NASA contract and is subject to the provisions of Public Law 96-517 (35 USC 202) in which the contractor has elected not to retain title.

FIELD OF THE INVENTION

The invention relates in general to a device for selectively mixing solutions, and in particular to an apparatus designed for carrying out protein crystallization and chemical synthesis in a low gravity environment.

BACKGROUND OF THE INVENTION

At present, proteins and other small molecules are crystallized by a variety of conventional experimental methods. Among these many methods, there are three that are most commonly used in the art. These three methods are (1) vapor diffusion methods, which decrease the solubility and concentrate the molecules to be crystallized by means of solvent evaporation. This method is often referred to as the "hanging drop technique." (2) The batch method, which decreases the solubility of the molecule by the direct addition of various precipitating agents to the solution. These precipitating agents are usually organic compounds such as polyethylene glycol, or inorganic salts such as ammonium sulphate. (3) The dialysis method, in which the protein or other molecular solution is physically isolated from the precipitating agent by a semi-permeable membrane. Upon activation, the precipitating agents diffuse through the membrane and mix with the protein solution. In general, if the other experimental factors are appropriately chosen, e.g., pH and temperature, crystallization of the protein or other molecule occurs during conditions of supersaturation.

Unfortunately, it has been observed that crystal growth and other chemical syntheses carried out under normal gravitational conditions suffer from turbulent convective flows which occur in all of the above described methods. In particular, during crystal growth under 1g the solute-depleted regions surrounding a growing crystal normally produce these turbulent convective flows which appear to have significant effects on the crystal quality. For methods such as liquid - liquid diffusion and dialysis, which require the diffusive mixing of two solutions of greatly differing densities, the elimination of these density driven convection flows is of the utmost importance if one is to successfully carry out crystal growth and other chemical syntheses.

In microgravity, i.e., low gravity environments, crystal growth and chemical syntheses can be carried out with no density driven convective flows. Under these conditions, crystal growth primarily becomes a diffusion limited process. Current research indicates that the slower approach to critical supersaturation occurring in low gravity environments reduces the number of nucleation sites created, and increases the terminal size of the crystals grown therein. The application of very slow diffusive mixing which will occur in microgravity is also advantageous in that it allows the conditions of supersaturation to be approached in a uniform gradient. As a result of lack of turbulence and very slow diffusive mixing, low gravity environments are ideal for maximizing crystal growth and successfully carrying out a variety of other chemical syntheses.

Although there are devices presently known for carrying out chemical synthesis under low gravity conditions, such as the Littke sliding seal arrangement, the Boeing dialysis device and the 3-M liquid-liquid diffusion flight hardware, there are no present devices for simply and inexpensively carrying out a large number of chemical syntheses or small molecule crystallization operations, particularly where those operations require a quench step. It is thus desirable to develop a simple device made of inexpensive materials which can carry out a large number of crystallization experiments or chemical reactions while taking advantage of the benefits of a low gravity environment.

SUMMARY OF THE INVENTION

According to the present invention, there is provided an apparatus for carrying out crystal growth and chemical syntheses, by allowing mixing of solutions under low gravity conditions, which comprises a housing, a plurality of chambers disposed in the housing and positioned so that an opening in the first chamber is separated from an opening in the second chamber by a cylindrical valve disposed between the two chambers, said valve having an internal passageway so that in one position fluid movement is allowed between the two chambers, and in a second position to fluid movement between the two chambers can take place. Protein, small molecule, or other crystal growth is accomplished by placing precursor solutions in each of the chambers and rotating the valve to mix the solutions when the apparatus is placed in a low gravity environment. In an alternate embodiment of the invention, a third chamber can be disposed in the housing and the cylindrical valve can have an additional passageway separate from the first passageway so as to allow fluid movement from the third chamber to either or both of the first two chambers. This second embodiment is particularly suitable when it is desired to deactivate or terminate the crystallization process resulting from the mixing of the first two solutions, or to perform a second synthetic step in a chemical synthesis. The apparatus of the present invention is modular so that a plurality of housings each with their own set of chambers can be placed side by side so that by turning one cylindrical valve a large number of experiments, crystallizations, or chemical syntheses can take place simultaneously.

BRIEF DESCRIPTION OF THE DRAWING FIGURES

DETAILED DESCRIPTION OF THE PREFERRED EMBODIMENTS

Figure 1:
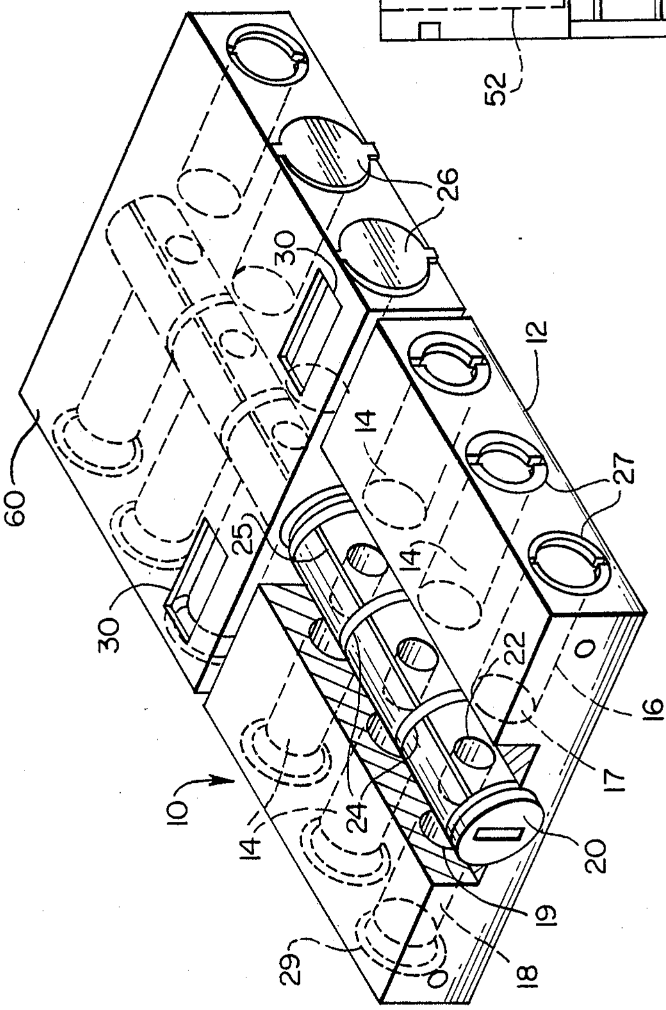
FIG. 1 is a perspective partially cutaway view of an embodiment of the present invention.

An apparatus suitable for carrying out protein or small molecule crystallization and other chemical syntheses by allowing mixing of solutions in low gravity environments according to the present invention is depicted in FIG. 1. The apparatus 10 is essentially comprised of a housing 12, a plurality of chambers 14, and a roughly cylindrical valve 20 which is disposed between at least two of the chambers so as to control fluid movement between chambers on opposite sides of the valve. In the embodiment depicted in FIG. 1, it can be observed that for an individual housing there are three chambers 14 on each side of cylindrical valve 20. However, a greater or lesser number of chambers separated by the valve can be employed if so desired. Cylindrical valve 20 contains at least one internal passageway 22, and at least one pair of chambers, 16 and 18, are positioned so that a fluid can flow from chamber 16 through inner chamber opening 17, the passageway 22, and inner chamber opening 19 into chamber 18, or vice versa, when the passageway is aligned with the internal openings. The valve 20 is rotatable from the position observed in FIG. 1 to a position wherein no fluid movement between chambers 16 and 18 can take place. In this embodiment, solutions can be placed in chambers 16 and 18 when the valve is positioned to block fluid movement between the chambers, and when an appropriate microgravity environment is achieved, the solutions can be mixed by rotating valve 20 so that the passageway 22 is aligned with inner chamber openings 17 and 19. This embodiment will be employed when it is only desired to mix together two different solutions at one time. As can be observed in FIG. 1, a number of two-solution mixtures can be created simultaneously when valve 20 is positioned so that fluids from chambers on one side of the valve are allowed to mix with fluids from the chambers on the opposite side of the valve.

Figure 2:
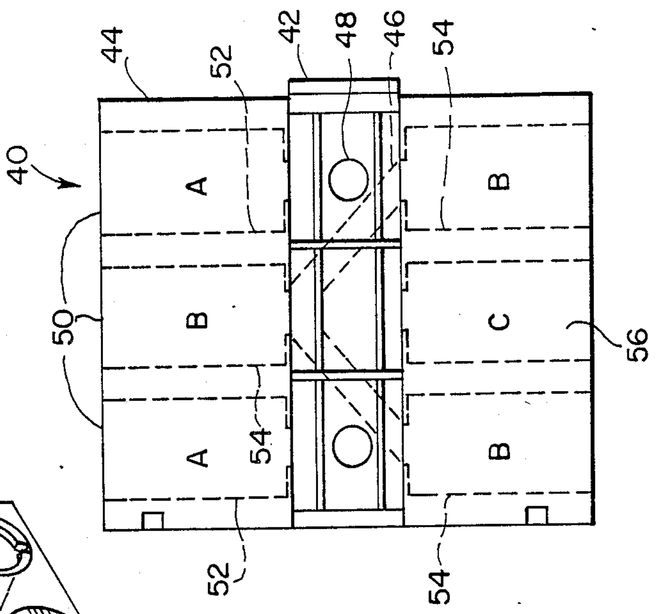
FIG. 2 is a side cross-sectional view of an alternative embodiment of the present invention.

When it is desired to mix a third solution with the first two solutions, the apparatus of the present invention can employ a modified cylindrical valve 42 as observed in cross-section in FIG. 2. The apparatus 40 depicted in FIG. 2 is similar to the apparatus shown in FIG. 1 except for the modified valve 42 and at least one additional chamber in addition to the first pair of chambers disposed in the housing, with fluid communication possible between at least these three chambers through cylindrical valve 42. In addition to internal passageway 48 of valve 42 which is similar to passageway 22 of the valve 20 shown in FIG. 1, valve 42 contains internal passageway 46 which is disposed so as to allow fluid movement from the third chamber to either of said first or second chambers. As can be observed in FIG. 2, the chambers 50 are arranged so that, for example, solution A can be placed in the chambers indicated at 52, solution B can be placed in the three chambers indicated at 54, and solution C or quench solution can be placed in the chamber 56. In the configuration shown at FIG. 2, the valve 42 is at a position where fluid communication is only allowed through chambers 54, and thus there is no mixing of different solutions. When rotated ninety degrees from the observed configuration, the valve will allow passage of fluid from the two A chambers to the two B chambers on the opposite side of valve 42, thus allowing mixing of solutions A and B. After the first two solutions are mixed, the valve 42 can be rotated again so that passageway 46 now provides fluid communication between chamber 56 (containing solution C) and the two chambers 52 which now contain a mixture of solutions A and B. At this point, solution C will enter chambers 52 containing the mixed A and B solution, and can either deactivate the solution, or provide a further synthetic step depending upon the nature of the particular C solution chosen. When it is desired to deactivate or terminate the crystal growth or synthesis that occurs when solutions A and B are mixed, a suitable deactivating agent will be loaded into and stored in chamber 56. In this embodiment, valve 42 is further rotatable to a position wherein no fluid movement between any of the chambers is allowed. This position is generally desirable when one wishes to load the apparatus with solutions or when the end of a particular set of experiments or syntheses has occurred.

The apparatus is preferably constructed from any of the many lightweight inexpensive durable plastic materials presently known. However, other materials, such as stainless steel or other similar alloys are also suitable for constructing the unit. It is necessary, however, that the housing materials be chemically inert so that the mixing of solutions and chemical reactions occurring are not impeded in any way. It is particularly desirable to construct the housing out of a clear plastic material such as PLEXIGLAS (methyl acrylate plastic), polyethylene (particularly high molecular weight polyethylene) or TEFLON (polytetrafluorethylene or PTFE) so that it will be possible to view the ongoing chemical syntheses visually or with a remote camera. If the plastic material used for the housing is opaque, then it will be desirable that housing 12 contain sets of windows 30 (as observed in FIG. 1) above all or some of the chambers, again so that the reactions inside the apparatus can be monitored or studied visually.

Figure 3:
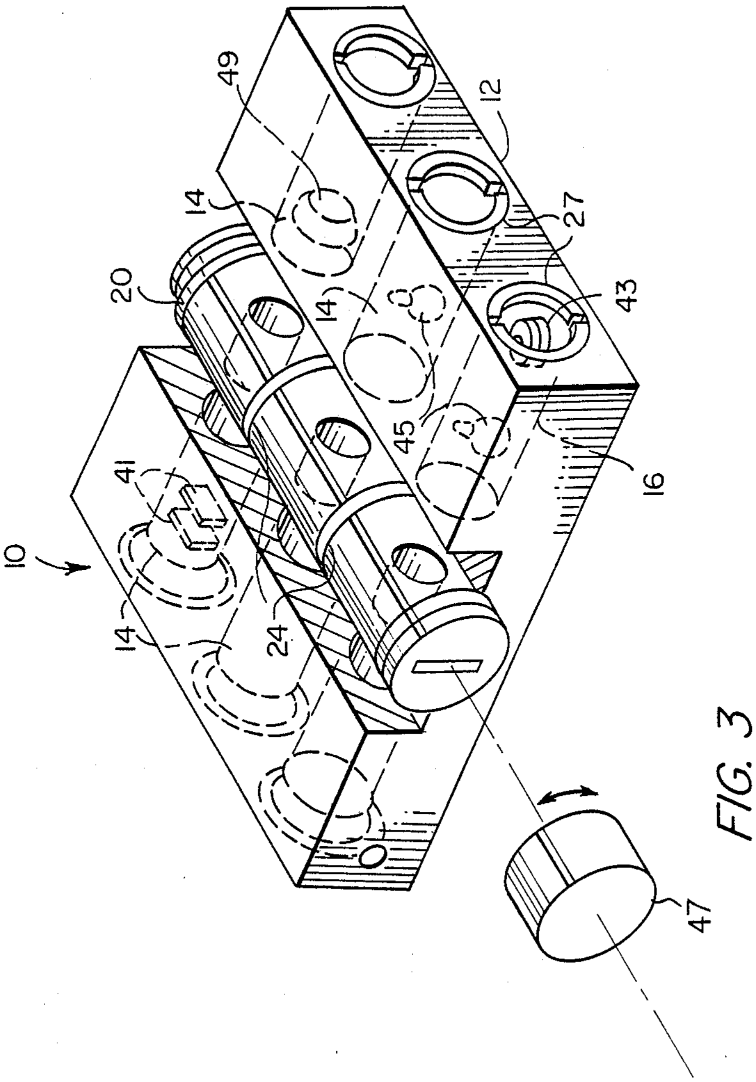
FIG. 3 is a perspective partially cutaway view of an additional embodiment of the present invention.

It is necessary in the apparatus to ensure a leak-proof arrangement so that solutions only mix when desired, and minimal loss of fluid occurs. It is preferred that a leak-tight system is provided by means of O-rings 24 which can be placed in interleaving fashion on the rotating valve 20 so that the set of chambers in tandem are kept isolated from other chambers. It is also desirable to provide linear strips 25 on the valve so as to minimize leaks when the chambers are connected by the valve. The O-rings and linear seals are preferably made of silicon rubber or other similar materials. The inner openings 17 and 19 of the chambers can also be provided with an O-ring seal if desired to further prevent leaks. In general, the apparatus is constructed so that the valve 20 fits into housing 12 snugly yet rotatably, and the potential leakage between the chambers is further prevented by the O-ring seals as described. There will also be cases wherein one or more of the fluids to be mixed will be primarily gaseous. In these situations, it may be necessary to provide glass frit, PEG (polyethylene glycol) particles, or plastic baffles inside a chamber to control the mixing and reduce the tendency for the gases to leak out. In general, fritted glass, PEG, or plastic baffles can be employed in a chamber to prevent turbulent mixing when the valve is rotated. When desired, the fritted glass or PEG 49, plastic baffles 41, or other turbulence-reducing substance can be placed directly in a chamber 14, as observed in FIG. 3.

In the preferred embodiment, the outer openings 27 of the chamber 14 are sealed by means of screw-in caps 26. It is desirable that such a cap be capable of forming an air-tight seal with a particular chamber, and further that the cap be composed of a durable but elastic material which will allow filling of the chambers with fluids by means of a syringe needle when the cap is in place. It is thus preferred that the screw-in caps employed in the invention contain Teflon-coated silicon rubber septums which can be effective in forming an air-tight chamber seal.

Another feature of the present invention is that housing 12 is modular in design, and further additional housing units 60, as observed in FIG. 1, can be employed at the same time. In such a system, which can have units employing either valve 20 or 42, the valve in the first housing 12 will be connected to the valve in second housing 60, which can be connected to valves in additional housings if so desired. In this way, sets of experiments or syntheses can be made to occur in the various housings by the mere turning of the valve in one housing. This feature allows simultaneous activation of many similar chemical syntheses, or different reactions if desired, by choosing the appropriate valves, and loading each housing with a particular set of precursor solutions. It is contemplated that since use of the apparatus will likely be in such low gravity environments such as outer space, it will be of particular value to employ remotely controlled mechanical means for the simple function of rotating the valve when desirable conditions are achieved. This can be achieved by means such as a remotely controlled means 47, as observed in Figure 3, which can rotate valve 20 when actuated by the remote control means. Thus, the apparatus of the present invention will provide a means whereby a large number of protein crystallizations or other chemical syntheses can be carried out in space simply and effectively by remote control of the cylindrical valve.

The apparatus of the present invention is particularly suitable for carrying out dialysis, liquid-liquid diffusion, and batch-method diffusion in low gravity environments. In those environments, these methods are particularly advantageous for accomplishing successful protein crystallizations and other chemical syntheses. In operation, the chambers can be loaded with precursor solutions while the valve is positioned so that no fluid movement can occur between chambers. However, it is also possible to utilize the internal valve passageway in the loading of solutions in the chambers. In one such mode, the chambers are first aligned as in FIG. 1, and a cap is screwed in place at the outer opening 29 of chamber 18 (or additional chambers on that side of the housing as desired). With the valve in open position, chamber 18 is filled with a first solution (solution A) past valve 20 and into chamber 16, at which point the valve is then rotated closed. The excess solution A is removed from chamber 16, and, if it is desired to carry out dialysis, dialysis means such as dialysis buttons 43 or membrane sacks 45 are placed in chamber 16 (or additional chambers as needed, as observed in FIG. 3. In carrying out batch or liquid-liquid diffusion, such means will not be necessary.

At this point, a cap to seal chamber 16 is prepared by puncturing the cap's septum by means of a syringe needle (not shown). When thus prepared, the syringe/cap arrangement can then be sealed into outer opening 27 of chamber 16. This first syringe needle is utilized to allow the air in chamber 16 to escape as the cap is therein screwed in place. A second syringe needle, containing a second solution (solution B), is then employed to introduce solution B to chamber 16, and this filling occurs as air escapes through the first syringe needle. After all air has escaped through the first needle, both syringes are withdrawn, and the Teflon(PTFE)-coated rubber septum of the caps seals the solution in place. As filled, the apparatus of the present invention can then be utilized to mix solutions from the two chambers when a low gravity environment is achieved. When a one-step protein crystallization or chemical synthesis reaction is desired, the valve 20 as observed in FIG. 1 is employed, and the solutions from opposite chambers are mixed by the 90-degree rotation of the valve at the desired time. When a second chemical synthetic step is required, or if a quench step to deactivate the first reaction is desired, the valve 42 as observed in FIG. 2 will be employed, and a third solution (solution C) will be allowed to mix with the solutions A and B which will have been mixed in an earlier step. By use of the apparatus of the present invention in low gravity environments in the manner described above, protein and other small molecule crystal growth and various chemical syntheses can be carried out simply, conveniently, and with better results than would be possible under normal Earth gravitational conditions.

What is claimed is:

1. An apparatus for allowing mixing of solutions under low gravity conditions which is suitable for carrying out dialysis comprising:

a housing;

a plurality of chambers disposed in said housing and positioned so that an opening in a first chamber is separated from an opening in a second chamber in such a manner that a valve can be placed between said two chambers so as to allow fluid movement between said two chambers, at least one of said chambers containing dialysis means; and a roughly cylindrical valve disposed between said two chambers, said valve having an internal passageway so as to allow fluid movement between said two chambers, and said valve being rotatable from a first position wherein no fluid movement between said two chambers can take place to a second position wherein fluid movement between said two chambers can take place.

2. An apparatus accoding to claim 1, wherein the dialysis means is selected from th group consisting of dialysis buttons and membrane sacks.

3. An apparatus for allowing mixing of solutions under low gravity conditions which is suitable for carrying out chemical synthesis comprising:

a housing;

a plurality of chambers disposed in said housing and positioned so that an opening in a first chamber is separated from an opening in a second chamber in such a manner that a valve can be placed between said two chambers so as to allow fluid movement between said two chambers, said first and second chamberse containing fluids which when mixed undergo chemical synthesis; and a roughly cylindrical valve disposed between said two chambers, said valve having an internal passageway so as to allow fluid movement between said two chambers, and said valve being rotatable from a first position wherein no fluid movement between said two chambers can take place to a second position wherein fluid movement between said two chambers can take place.

4. An apparatus according to claim 3 further comprising:

a third chamber disposed in said housing having an opening positioned so that said cylindrical valve can be disposed so as to allow fluid movement from said third chamber to either said first or second chambers;

said cylindrical valve further comprising a second internal passageway separate from the first internal passageway, said second internal passageway beingn disposed so as to allow fluid movement between said third chamber and either of said first or second chambers, and wherein said cylindrical valve is rotatable from a first position wherein no fluid is allowed to move between said chambers, to a second position wherein fluid movement between said first and second chambers can take place, and to a third position wherein fluid movements between said third chamber and either of said first or second chamber can take place.

5. An apparatus according to claim 4 wherein said third chamber contains a fluid which when mixed with the fluids from said first and second chambers quenches the chemical synthesis.

6. An apparatus according to claim 4 wherein said third chamber contains a fluid which when mixed with the fluids from said first and second chambers carries out a second synthetic step.

7. An apparatus according to claim 3 which is suitable for carrying out protein or small molecule crystallization.

8. An apparatus according to claim 3 wherein the chambers are sealed by screw-in caps.

9. An apparatus according to claim 8 wherein said screw-in caps contain a polytetrafluoroethylene-coated silicon rubber septum.

10. An apparatus according to claim 3 wherein said cylindrical valve can be rotated by remotely controlled mechanical means.

11. An apparatus according to claim 3 wherein said housing contains windows allowing one to view the interior of said chambers.

12. An apparatus according to claim 3 wherein said housing is comprised of a clear plastic material.

13. An apparatus according to claim 12 wherein said housing is comprised of a material selected from the group consisting of methyl acrylate plastic, polyethylene and polytetrafluoroethylene.

14. An apparatus according to claim 3 further comprising at least one additional housing, said additional housing having a cylindrical valve which is connectable to the cylindrical valve of the first housing so that mixing of solutions in the additional housing can occur by rotation of the cylindrical valve of the first housing.

15. An apparatus for allowing mixing of solutions under low gravity conditions comprising:

a housing;

a plurality of chambers disposed in said housing and positioned so that an opening in a first chamber is separated from an opening in a second chamber in such a manner that a valve can be placed between said two chambers so as to allow fluid movement between said two chambers, at least one of said chambers containing a material for preventing turbulent mixing of the solutions; and a roughly cylindrical valve disposed between said two chambers, said valve having an internal passageway so as to allow fluid movement between said two chambers, and said valve being rotatable from a first position wherein no fluid movement between said two chambers can take place to a second position wherein fluid movement between said two chambers can take place.

16. An apparatus according to claim 15 wherein the material for preventing turbulent mixing is selected from the group consisting of fritted glass, polyethylene glycol, and plastic baffles.

* * * * *